(12) United States Patent
Lewin et al.

(10) Patent No.: US 11,770,439 B2
(45) Date of Patent: *Sep. 26, 2023

(54) WEB SERVER REQUEST IDENTIFICATION

(71) Applicant: Microsoft Technology Licensing, LLC, Redmond, WA (US)

(72) Inventors: Guy Lewin, Tel Aviv (IL); Itamar Azulay, Mishmar Ayyalon (IL); Yossi Haber, Ganei Tikva (IL)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/839,919

(22) Filed: Jun. 14, 2022

(65) Prior Publication Data
US 2022/0311820 A1 Sep. 29, 2022

Related U.S. Application Data

(63) Continuation of application No. 16/444,762, filed on Jun. 18, 2019, now Pat. No. 11,394,765.

(51) Int. Cl.
*H04L 67/02* (2022.01)
*H04L 9/40* (2022.01)
*H04L 67/2895* (2022.01)
*G06F 16/957* (2019.01)
*G06F 16/951* (2019.01)
*G06F 8/30* (2018.01)
(Continued)

(52) U.S. Cl.
CPC ............... *H04L 67/02* (2013.01); *G06F 8/30* (2013.01); *G06F 16/951* (2019.01); *G06F 16/9574* (2019.01); *G06F 40/143* (2020.01); *H04L 63/0218* (2013.01); *H04L 63/0227* (2013.01); *H04L 63/0281* (2013.01); *H04L 67/2895* (2013.01); *H04L 67/562* (2022.05)

(58) Field of Classification Search
CPC ...... G06F 16/951; G06F 8/30; G06F 16/9574; G06F 40/143; H04L 63/102; H04L 63/10; H04L 67/02; H04L 63/08; H04L 63/0884; H04L 67/5681; H04W 12/37
See application file for complete search history.

(56) References Cited

U.S. PATENT DOCUMENTS 7,490,141 B1 * 2/2009 Cammarata ............. H04L 67/02
709/227
9,953,014 B1 * 4/2018 Reshadi .............. G06F 16/9574
(Continued)

OTHER PUBLICATIONS

"International Search Report and Written Opinion Issued in PCT Application No. PCT/US20/031396", dated Jul. 15, 2020, 10 Pages. (parent U.S. Appl. No. 16/444,762 filed Jun. 18, 2019).
(Continued)

*Primary Examiner* — Kyung H Shin
(74) *Attorney, Agent, or Firm* — Ogilvie Law Firm

(57) ABSTRACT

A proxy server to receive a request from a client to a webserver and a response corresponding with the request from the webserver to the client is disclosed. The request is wrapped, and a wrapped request is received at the proxy server. The wrapped request is read at the proxy server. Metadata is added to a response corresponding with the wrapped request at the proxy server. The metadata can be based on the read wrapped request or the corresponding response.

20 Claims, 3 Drawing Sheets

(51) Int. Cl.
   *G06F 40/143* (2020.01)
   *H04L 67/562* (2022.01)

(56) References Cited

U.S. PATENT DOCUMENTS

| | | | | |
|---|---|---|---|---|
| 2004/0088713 | A1* | 5/2004 | Myllymaki | G06F 16/951 |
| | | | | 707/E17.108 |
| 2009/0287836 | A1* | 11/2009 | Cammarata | H04L 67/02 |
| | | | | 709/229 |
| 2014/0157369 | A1* | 6/2014 | Mischook | H04L 63/102 |
| | | | | 726/4 |
| 2015/0188779 | A1 | 7/2015 | Mccanne et al. | |
| 2017/0048319 | A1* | 2/2017 | Straub | G06F 16/9574 |

OTHER PUBLICATIONS

"Office Action Issued in Chinese Patent Application No. 202080043721.4", dated Jul. 12, 2023, 8 Pages.

* cited by examiner

WEB SERVER REQUEST IDENTIFICATION

RELATED APPLICATION

The present application is a continuation of, incorporates by reference the entirety of, and claims priority to, U.S. patent application Ser. No. 16/444,762 filed Jun. 18, 2019.

BACKGROUND

Cloud computing is a model of service delivery for enabling convenient, on-demand network access to a shared pool of configurable computing resources that can be rapidly generated and released with nominal management effort or interaction with a provider of the service. Cloud computing allows a cloud consumer to obtain computing resources, such as networks, network bandwidth, servers, processing memory, storage, applications, virtual machines, and services as a service on an elastic and sometimes impermanent basis. Cloud computing platforms and infrastructures allow developers to build, deploy, and manage assets and resources for applications. Cloud computing may include security services that can protect resource and assets from attack.

SUMMARY

This summary is provided to introduce a selection of concepts in a simplified form that are further described below in the Description. This summary is not intended to identify key features or essential features of the claimed subject matter, nor is it intended to be used to limit the scope of the claimed subject matter.

Cloud computing environments can include security services such as a cloud access security broker that can enforce policies and log session data between a user and a web application. The present disclosure is directed to a proxy server to receive a request from a client to a webserver and a response corresponding with the request from the webserver to the client. In one example, the request is an AJAX request, such as an XMLHttpRequest object or a fetch method in a web application. Traffic between the client and the webserver is directed through the proxy server. The request is wrapped at the client side, such as with a web browser operating a wrapping engine provided from the security server, to form a wrapped request. The wrapped request is read at the proxy server. In one example, the contents of the wrapped request are determined at the proxy server. For instance, contents of the wrapped request can be read to determine whether the request is for a file download or simple data. Metadata is added to a response corresponding with the wrapped request at the proxy server. The metadata can be based on the read wrapped request, such as the contents of the wrapped request, the response, or other. The metadata can be processed at the client such as via the wrapping engine, which can include hooks to read the metadata. In one example, the proxy server is implemented on premises or in a cloud access security broker. The proxy server can be a reverse proxy server to provide services between a client, such as a user in an enterprise, and a web server running a web application, such as a software as a service application.

BRIEF DESCRIPTION OF THE DRAWINGS

The accompanying drawings are included to provide a further understanding of embodiments and are incorporated in and constitute a part of this disclosure. The drawings illustrate embodiments and together with the description serve to explain principles of embodiments. Other embodiments and many of the intended advantages of embodiments will be readily appreciated, as they become better understood by reference to the following description. The elements of the drawings are not necessarily to scale relative to each other. Like reference numerals designate corresponding similar parts.

DESCRIPTION

In the following Description, reference is made to the accompanying drawings, which form a part hereof, and in which is shown by way of illustration specific embodiments in which the invention may be practiced. It is to be understood that other embodiments may be utilized and structural or logical changes may be made without departing from the scope of the present invention. The following description, therefore, is not to be taken in a limiting sense. It is to be understood that features of the various example embodiments described herein may be combined, in part or whole, with each other, unless specifically noted otherwise.

Figure 1:
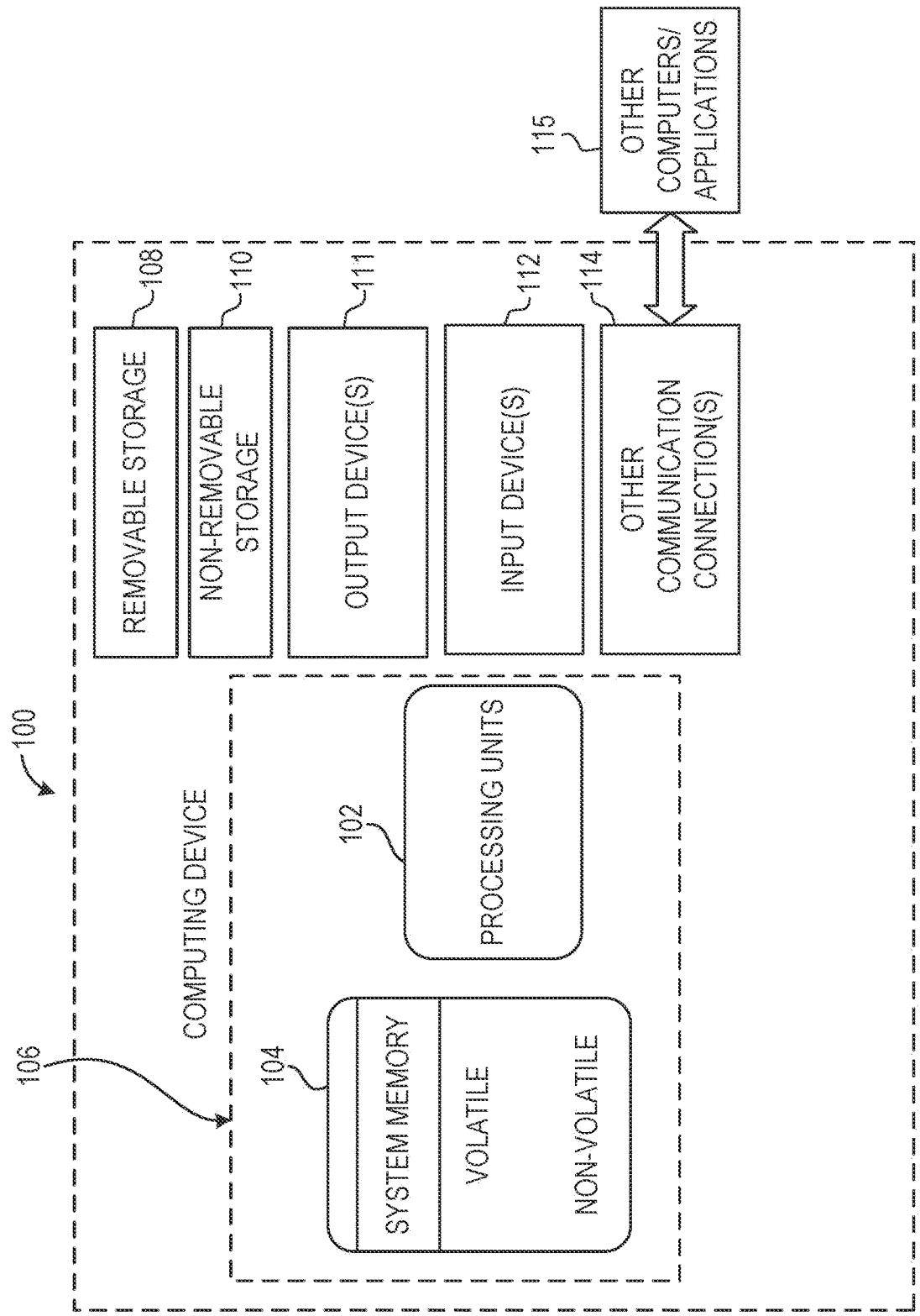
FIG. 1 is a block diagram illustrating an example of a computing device, which can be configured in a computer network to provide, for example, a cloud-computing environment.

FIG. 1 illustrates an exemplary computer system that can be employed in an operating environment and used to host or run a computer application included on one or more computer readable storage mediums storing computer executable instructions for controlling the computer system, such as a computing device, to perform a process. The exemplary computer system includes a computing device, such as computing device 100. The computing device 100 can take one or more of several forms. Such forms include a tablet, a personal computer, a workstation, a server, a handheld device, a consumer electronic device (such as a video game console or a digital video recorder), or other, and can be a stand-alone device or configured as part of a computer network.

In a basic hardware configuration, computing device 100 typically includes a processor system having one or more processing units, i.e., processors 102, and memory 104. By way of example, the processing units may include two or more processing cores on a chip or two or more processor chips. In some examples, the computing device can also have one or more additional processing or specialized processors (not shown), such as a graphics processor for general-purpose computing on graphics processor units, to perform processing functions offloaded from the processor 102. The memory 104 may be arranged in a hierarchy and may include one or more levels of cache. Depending on the configuration and type of computing device, memory 104 may be volatile (such as random access memory (RAM)), nonvolatile (such as read only memory (ROM), flash memory, etc.), or some combination of the two.

Computing device 100 can also have additional features or functionality. For example, computing device 100 may also include additional storage. Such storage may be removable or non-removable and can include magnetic or optical disks, solid-state memory, or flash storage devices such as removable storage 108 and non-removable storage 110. Computer storage media includes volatile and nonvolatile, removable and non-removable media implemented in any suitable method or technology for storage of information such as computer readable instructions, data structures, program modules or other data. Memory 104, removable storage 108 and non-removable storage 110 are all examples of computer storage media. Computer storage media includes RAM, ROM, EEPROM, flash memory or other memory technology, CD-ROM, digital versatile discs (DVD) or other optical storage, magnetic cassettes, magnetic tape, magnetic disk storage or other magnetic storage devices, universal serial bus (USB) flash drive, flash memory card, or other flash storage devices, or any other storage medium that can be used to store the desired information and that can be accessed by computing device 100. Accordingly, a propagating signal by itself does not qualify as storage media. Any such computer storage media may be part of computing device 100.

Computing device 100 often includes one or more input and/or output connections, such as USB connections, display ports, proprietary connections, and others to connect to various devices to provide inputs and outputs to the computing device. Input devices 112 may include devices such as a keyboard, pointing device (e.g., mouse, track pad), stylus, voice input device, touch input device (e.g., touchscreen), or other. Output devices 111 may include devices such as a display, speakers, printer, or the like.

Computing device 100 often includes one or more communication connections 114 that allow computing device 100 to communicate with other computers/applications 115. Example communication connections can include an Ethernet interface, a wireless interface, a bus interface, a storage area network interface, and a proprietary interface. The communication connections can be used to couple the computing device 100 to a computer network, which can be classified according to a wide variety of characteristics such as topology, connection method, and scale. A network is a collection of computing devices and possibly other devices interconnected by communications channels that facilitate communications and allows sharing of resources and information among interconnected devices. Examples of computer networks include a local area network, a wide area network, the internet, or other network.

In one example, one or more of computing device 100 can be configured as a client device for a user in the network. The client device can be configured to establish a remote connection with a server on a network in a computing environment. The client device can be configured to run applications or software such as operating systems, web browsers, cloud access agents, terminal emulators, or utilities.

In one example, one or more of computing devices 100 can be configured as servers in a datacenter to provide distributed computing services such as cloud computing services. A data center can provide pooled resources on which customers or tenants can dynamically provision and scale applications as needed without having to add servers or additional networking. The datacenter can be configured to communicate with local computing devices such used by cloud consumers including personal computers, mobile devices, embedded systems, or other computing devices. Within the data center, computing device 100 can be configured as servers, either as stand alone devices or individual blades in a rack of one or more other server devices. One or more host processors, such as processors 102, as well as other components including memory 104 and storage 110, on each server run a host operating system that can support multiple virtual machines. A tenant may initially use one virtual machine on a server to run an application. The datacenter may activate additional virtual machines on a server or other servers when demand increases, and the datacenter may deactivate virtual machines as demand drops.

Datacenter may be an on-premises, private system that provides services to a single enterprise user or may be a publicly (or semi-publicly) accessible distributed system that provides services to multiple, possibly unrelated customers and tenants, or may be a combination of both. Further, a datacenter may be a contained within a single geographic location or may be distributed to multiple locations across the globe and provide redundancy and disaster recovery capabilities. For example, the datacenter may designate one virtual machine on a server as the primary location for a tenant's application and may activate another virtual machine on the same or another server as the secondary or back-up in case the first virtual machine or server fails.

A cloud-computing environment is generally implemented in one or more recognized models to run in one or more network-connected datacenters. A private cloud deployment model includes an infrastructure operated solely for an organization whether it is managed internally or by a third-party and whether it is hosted on premises of the organization or some remote off-premises location. An example of a private cloud includes a self-run datacenter. A public cloud deployment model includes an infrastructure made available to the general public or a large section of the public such as an industry group and run by an organization offering cloud services. A community cloud is shared by several organizations and supports a particular community of organizations with common concerns such as jurisdiction, compliance, or security. Deployment models generally include similar cloud architectures, but may include specific features addressing specific considerations such as security in shared cloud models.

Cloud-computing providers generally offer services for the cloud-computing environment as a service model provided as one or more of an infrastructure as a service, platform as a service, and other services including software as a service. Cloud-computing providers can provide services via a subscription to tenants or consumers. For example, software as a service providers offer software applications as a subscription service that are generally accessible from web browsers or other thin-client interfaces, and consumers do not load the applications on the local computing devices. Infrastructure as a service providers offer consumers the capability to provision processing, storage, networks, and other fundamental computing resources where the consumer is able to deploy and run software, which can include operating systems and applications. The consumer generally does not manage the underlying cloud infrastructure, but generally retains control over the computing platform and applications that run on the platform. Platform as a service providers offer the capability for a consumer to deploy onto the cloud infrastructure consumer-created or acquired applications created using programming languages, libraries, services, and tools supported by the provider. In some examples, the consumer does not manage or control the underlying cloud infrastructure including network, servers, operating systems, or storage, but has control over the deployed applications and possibly configuration settings for the application-hosting environment. In other examples, the provider can offer a combination of infrastructure and platform services to allow a consumer to manage or control the deployed applications as well as the underlying cloud infrastructure. Platform as a service providers can include infrastructure, such as servers, storage, and networking, and also middleware, development tools, business intelligence services, database management services, and more, and can be configured to support the features of the application lifecycle including one or more of building, testing, deploying, managing, and updating.

Figure 2:
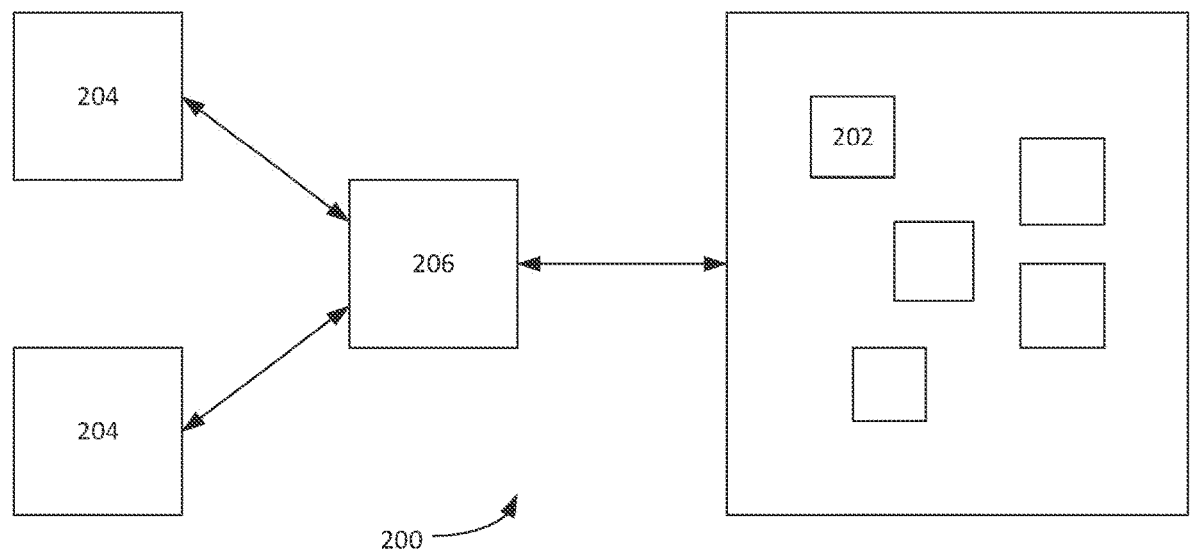
FIG. 2 is a schematic diagram illustrating an example a cloud-computing environment.

FIG. 2 illustrates an example computer network 200 such as a cloud-computing environment to deploy a dynamic web page, which can include a web application 202, on web servers to be accessed by users on a client device 204. In the illustrated example, the network 200 includes a security service 206, which may include a security broker such as a cloud access security broker, disposed to process network traffic between client devices 204 and web applications 202. A web application 202 is a software application that runs on a remote server. In many cases, a web browser on the client device 204 is used to access web applications, over the network 200, such as the internet.

In one example, the web application can be configured as a software as a service application, or SaaS. SaaS is a software model in which software is licensed on a subscription basis and is centrally hosted. SaaS is typically accessed by users using a thin client, e.g. via a web browser application on a computing device, such as computing device 100. SaaS has become a common delivery model for many business applications. SaaS applications are also known as web-based software, on-demand software and hosted software. Many SaaS applications are based on a multitenant architecture in which a single version of the application, with a single configuration such as hardware, network, and operating system, is used for all customers, or tenants. To support scalability, the application is installed on multiple machines or horizontally scaled, in an environment such as a datacenter or multiple datacenters. This is contrasted with a more traditional application architecture, in which multiple physical copies of the software, which may include different versions, or different configurations, are installed across various customer sites such as on different computing devices of the enterprise. Some SaaS applications do not use multitenancy, or may use other mechanisms such as virtualization to cost-effectively manage a large number of customers in place of multitenancy. SaaS applications have become popular with standardization of web page technologies (such as HTML, JavaScript, and CSS) and the introduction and ubiquity of web application frameworks that have gradually reduced the cost of developing SaaS solutions.

In some examples, SaaS applications can involve access to or integration with customer current data, and in cases when such data are large in volume or sensitive, integrating the data with remotely hosted software can be costly or risky, or can conflict with data governance regulations.

Security service 206, such as a cloud access security broker, provides services between the user 204 and the web application 202. In one example, the security service 206 may support multiple users of an enterprise, such as users 204 to access multiple SaaS applications, such as web application 202, subscribed to or otherwise accessed by the enterprise. In some examples, security service 206 may be deployed on premises or accessed via a cloud service. In one example, the security service 206 may support multiple enterprises accessing one or more sets of SaaS applications in a multitenancy model. Security service 206 can monitor activity between users 204 and the web applications 202 and enforce security policies. For example, a cloud access security broker can monitor user activity, warn administrators about potentially hazardous actions, enforce security policy compliance, and automatically prevent or reduce the likelihood of malware in the enterprise.

In one example, the security service 206 is a distributed, cloud-based proxy that is an inline broker for user and application activity. The security service 206 can apply authentication information within the architecture to track the identity of the users 204 and the accessed web applications 202. For example, the security service 206 can operate as a reverse proxy at the authentication or traffic level to create a redirection from the web application 202. Users 204 are directed to the web applications 204 through the security service 206 via a reverse proxy rather than directly between the user 204 and the web application 204. User requests and web application responses travel through the security service 206 during a session. For example, after authentication of a user 204 to a valid web application 202 served by the security service 206, the security service may replace web links to the web application 202 with domains of the security service 206 to keep the user within a session. For example, the web address corresponding with the web application 204 can be suffixed by a wrapping so as to be directed to a proxy server of security service 206. The security service 206 may append the security domains link to a link of the web application to keep relevant links, cookies, and scripts within the session. In one example, the security service 206 can save session activities into a log and enforce policies of the session.

Figure 3:
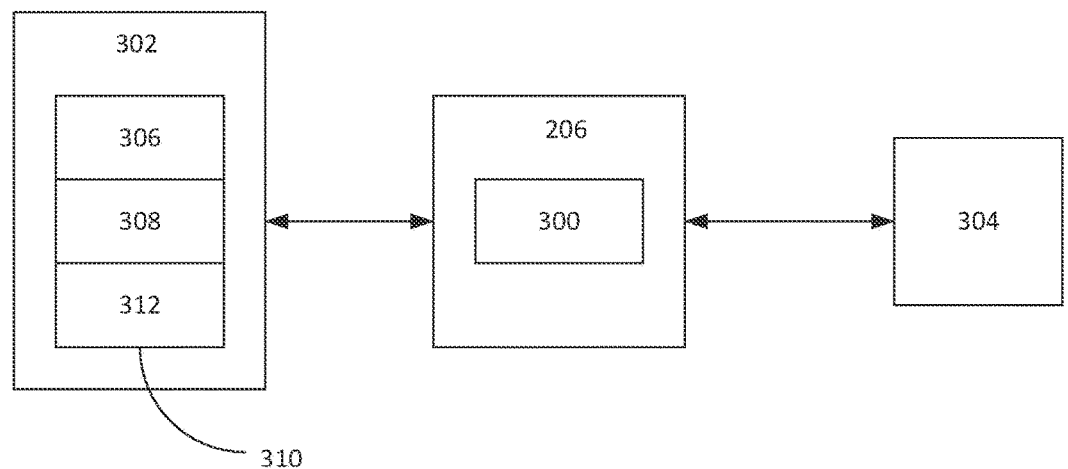
FIG. 3 is a schematic diagram illustrating an example web service request identification system, which can be included in the cloud computing environment of FIG. 2.

FIG. 3 illustrates a web application request and response identification system 300, which in one example, can be incorporated into security service 206. The identification system 300 can include a computer readable storage device to store computer executable instructions to control a processor, such as a server in a datacenter. In one example, identification system 300 can be implemented as a computer program to run a processor as part of a proxy server, such as a reverse proxy server, to direct traffic between a client 302 and a web application server 304 such as in security service 206. For instance, the system 300 can direct traffic related to a web application run on the client 302 and the web server 304.

In the example, a web application 202 can include a set of web development techniques, such as AJAX, using technologies on the client side to create a synchronous or an asynchronous web application 202. With AJAX, for example, web applications 202 can send and retrieve data from the web server 304 asynchronously without interfering generally with the display and behavior of the page in the web browser of the client 302. AJAX allows web applications 204 to change content of the web page dynamically without reloading the entire web page in the web browser. AJAX is often short for asynchronous JavaScript and XML, but can include other implementations, such as synchronous requests, JSON (JavaScript Object Notation) instead of XML for data interchange and other formats such as HTML or plain text could be used as well as other implementations of ECMAscript. The use of the terms AJAX and JavaScript are illustrative, and one skilled in the art can readily identify other implementations or examples of asynchronous client-side scripting technology. In one example of a web application model, web browser 310 at the client 302 implementing the web application can include a user interface 306 and an engine 308, such as an AJAX engine. The user interface 306 in the web browser 310 is decoupled from the engine 308 at the client 302. To update content on the web application, the user interface 306 sends a call to the engine 308. The engine 308 sends the request, such as an AJAX request, via asynchronous communication over a network connection to the web server 304. The web server 304 provides a response with data over HTTP such as XML or JavaScript data via the network connection to the engine 308. The engine 308 can provide the updated content to the user interface 306 with HTML/CSS data. In one example, AJAX requests can be executed within JavaScript with a built-in XMLHttpRequest (XHR) object or a fetch( ) method to load content onto the web browser 310 without refreshing a web page. XHR is an example application programming interface (API) in the form of an object whose methods transfer data between a web browser 310 and a web server 304. XHR can be used with protocols other than HTTP and can be in other forms than XML. The Fetch API provides a JavaScript interface for accessing and manipulating parts of the HTTP pipeline, such as requests and responses, with functionality similar to XHR. In the examples of the disclosure the AJAX request and corresponding response are directed between the client 302 and web server 304 via security service 206 implementing request and response identification system 300.

AJAX requests, such as XHR objects and fetch methods, can be provided to include different methods to different web servers. In general, a proxy service does not communicate with AJAX requests. In one example, a proxy service is prohibited from communicating with the AJAX request because of restrictions on cross-origin resource sharing, or CORS in the request. The lack of communication can leave gaps in the ability of a security broker to analyze request traffic and provide other client-side support.

A wrapping engine 312 is deployed at the client 302 in the web browser 310. In the example security service 206, the identification system 300 determines information about the communication over the network such as whether the response includes a file download or plain data from the web server 304, which can be used to log such information with the security service and provide metadata to the client 302. In the example, the system 300 receives the web application request from the client 302 bound for the web server 304. The system 300 via wrapping engine 312 causes the request to be wrapped, such as at the web browser 310. The system 300 reads the wrapped request and a corresponding response provided from the web server 304 to the client 302. In one example, the system 300 provides the wrapping engine 312 to the web browser 310, which can be incorporated into engine 308. The wrapping engine 312 wraps the request at the client side, such as at web browser 310, which is provided to the security service 206 operating a proxy server. The browser 310 via wrapping engine can include hooks that enable the wrapping engine to read a response to the wrapped request. The request is provided with a wrapper that does not affect the flow or write errors into the web browser 310. In one example, the system 300, via the wrapping engine 312, can determine whether the request is a XHR object or a fetch method. For instance, the system can check flags in the wrapped request to determine information and contents of the request. In the case of an XHR object, the wrapping engine 312 is able to read the wrapped request to determine whether it is synchronous or asynchronous (fetch methods are asynchronous), such as by checking flags in the request. The system 300 can log the contents of the request. As a reverse proxy, the system 300 provides the request, which is wrapped at the web browser 310, intended for the web server 304 and receives a corresponding response from the web server 304 bound for the client 302. The system 300 is able to read the response to the wrapped request to determine such content as whether the response includes a file download or plain data. The system 300 can log the information as to the contents of the response. The system 300 can also include metadata as to the contents of the response, such as headers. The header can include a hypertext transfer protocol HTTP communication header. For example, the system 300 can write a header to the response to alert the client 300 as to whether the response includes a file download or plain data. In one example, hooks, such as JavaScript hooks in the engine 308 can react to the metadata. The CORS restriction can be removed by adding an HTTP header to the response such as ACCESS-CONTROL-EXPOSE-HEADERS or other CORS headers.

Figure 4:
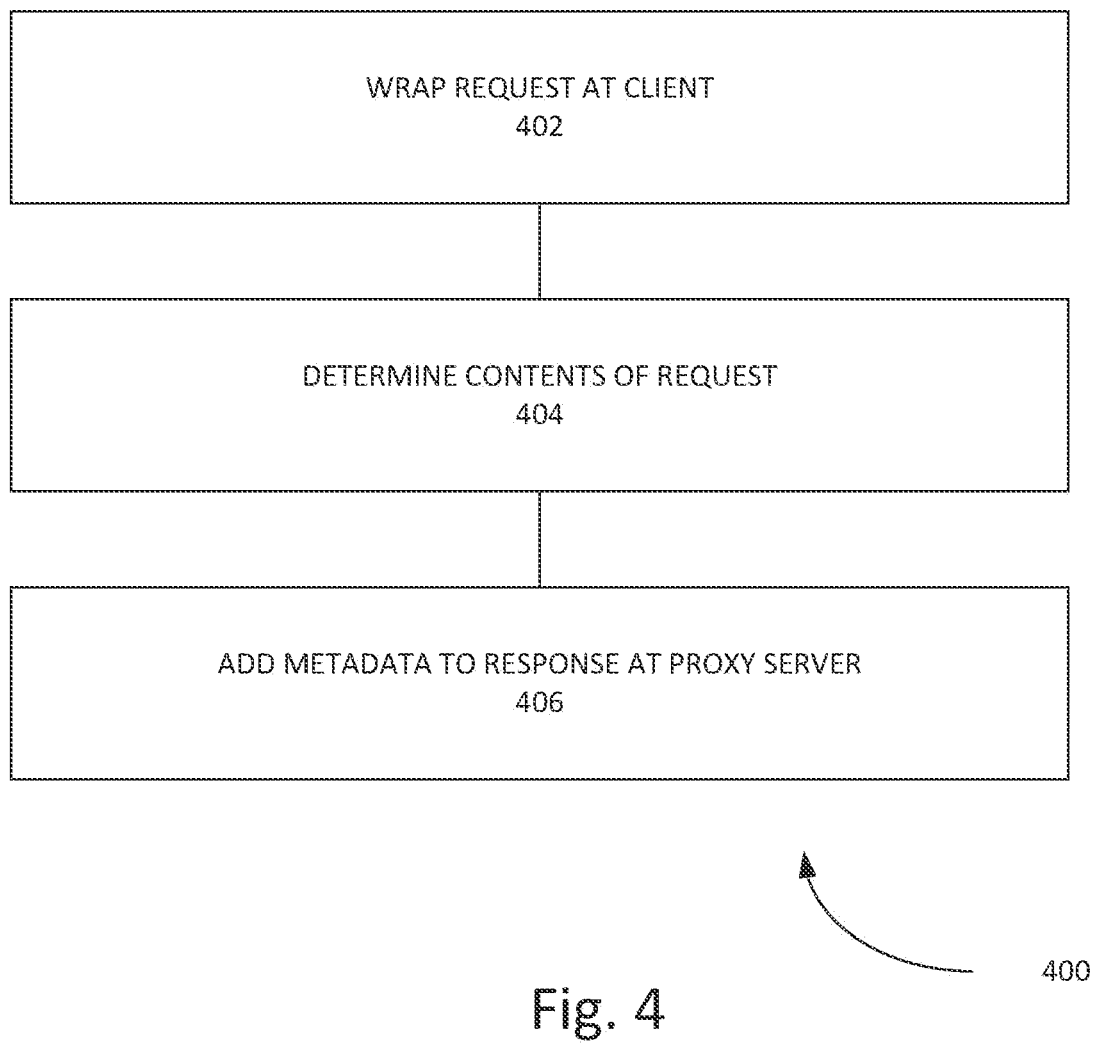
FIG. 4 is a block diagram illustrating an example method of the web service request identification system of FIG. 3.

FIG. 4 illustrates an example method 400 that can be used by the proxy server implementing the identification system 300. The proxy server receives a web application request from a client 302 to a webserver 304 and receives a corresponding response to the request from the webserver 304 to the client 302. For example, the request can be an AJAX request. The request is wrapped at the client side, such as with the web browser 310, and a wrapped request is received at the proxy server at 402. The security service 206 can provide a wrapping engine 312 to the client 302, such as to the web browser 310 to wrap requests and hook responses. The system 300 reads the wrapped request at the proxy server at 404. For example, the system 300 can determine contents of the wrapped request at the proxy server. In one example, the wrapping engine 312 can determine whether the request is asynchronous or synchronous by reading the wrapped request. The system 300 can also read, such as determine the contents of, the response corresponding with the wrapped request at the proxy server. For example, the system 300 can determine whether the response includes a file download or plain data. The system 300 can add metadata to the response at 406. For example, the system 300 can include metadata in the form of HTTP headers to the response to alert the client 302 as to whether the response includes a file download or plain data. The system can log this information with a security service. The client 302, such as engine 308, can read the metadata and react accordingly.

The example system 300 and method 400 can be implemented to include a combination of one or more hardware devices and computer programs for controlling a system, such as a computing system having a processor and memory, to perform method 400. For instance, system 300 and method 400 can be implemented as a computer readable medium or computer readable storage device having set of executable instructions for controlling the processor to perform the method 400. The system 300 and method 400 can be included as a service in a cloud environment, such as a security service implementing a cloud access security broker to enforce security polices, and implemented on a computing device 100 in a datacenter as a proxy server, such as a reverse proxy server, to direct web traffic between a client 302 and a web server 304.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein.

What is claimed is:

1. A method performed at a proxy server, the method comprising:
   receiving a wrapped request;
   finding a cross-origin resource sharing restriction in the wrapped request;
   determining the wrapped request includes a file download request; and
   adding metadata to a response, the response corresponding with the wrapped request, the metadata indicating removal of the cross-origin resource sharing restriction by adding a CORS header.

2. The method of claim 1 wherein the proxy server includes a reverse proxy server.

3. The method of claim 1 further comprising the proxy server directing traffic between a client and a webserver.

4. The method of claim 1 wherein the request includes an AJAX request.

5. The method of claim 4 wherein the AJAX request includes an XMLHttpRequest object.

6. The method of claim 4 wherein the AJAX request includes a fetch method.

7. The method of claim 4 wherein the AJAX request includes the cross-origin resource sharing restriction.

8. The method of claim 1 further comprising reading the response, and wherein the metadata includes metadata based on reading the response.

9. The method of claim 1 wherein adding metadata to the response includes adding a header to the response.

10. The method of claim 1 further comprising reading the response corresponding with the wrapped request.

11. A first computer readable storage device which stores first computer executable instructions which upon execution control a first processor at a proxy server to perform:
    receiving a wrapped request;
    finding in the wrapped request a cross-origin resource sharing restriction;
    and
    adding response metadata indicating a removal of the cross-origin resource sharing restriction by adding a CORS header.

12. The first computer readable storage device of claim 11 in combination with a second computer readable storage device which stores second computer executable instructions which upon execution control a second processor at a client to perform:
    wrapping the request from the client to the webserver, thereby creating the wrapped request;
    including in the wrapped request the cross-origin resource sharing restriction;
    including in the wrapped request the file download request; and
    sending the wrapped request with the cross-origin resource sharing restriction and the file download request toward the webserver.

13. The computer readable storage devices of claim 12, wherein the request includes an AJAX request.

14. The computer readable storage devices of claim 12 wherein the first computer executable instructions or the second computer executable instructions or both comprise instructions which upon execution route traffic between the client and the webserver.

15. A system, comprising:
    a memory device to store a set of instructions; and
    a processor to execute the set of instructions which upon execution:
       wrap a request from a client to a webserver, thereby creating a wrapped request at the client;
       read the wrapped request at a proxy server and determine the wrapped request includes a file download request;
       find a cross-origin resource sharing restriction in the wrapped request at the proxy server; and
       add metadata at the proxy server to a response from the webserver to the client, the response corresponding with the wrapped request, the metadata indicating removal of the cross-origin resource sharing restriction by adding a CORS header.

16. The system of claim 15 wherein the instructions are implemented with a security service.

17. The system of claim 16 wherein the security service includes a cloud access security broker.

18. The system of claim 17 wherein the cloud access security broker enforces security policies.

19. The system of claim 16 wherein the security service logs access of the web server.

20. The system of claim 15 wherein the proxy server includes a reverse proxy server configured to direct web traffic between the client and the webserver.

* * * * *